US009282696B2

(12) United States Patent
Regier

(10) Patent No.: US 9,282,696 B2
(45) Date of Patent: Mar. 15, 2016

(54) ADJUSTABLE VANE IN COMBINE HARVESTER

(71) Applicant: AGCO Corporation, Duluth, GA (US)

(72) Inventor: Bernard D. Regier, Newton, KS (US)

(73) Assignee: AGCO Corporation, Duluth, GA (US)

( * ) Notice: Subject to any disclaimer, the term of this patent is extended or adjusted under 35 U.S.C. 154(b) by 163 days.

(21) Appl. No.: 14/083,702

(22) Filed: Nov. 19, 2013

(65) Prior Publication Data

US 2015/0141097 A1    May 21, 2015

Related U.S. Application Data

(60) Provisional application No. 61/716,328, filed on Oct. 19, 2012.

(51) Int. Cl.
*A01F 12/28* (2006.01)

(52) U.S. Cl.
CPC ..................................... *A01F 12/28* (2013.01)

(58) Field of Classification Search
CPC ..... A01D 12/18; A01D 12/181; A01D 12/24; A01D 12/26; A01D 12/28; A01D 12/442; A01D 7/065; A01D 7/067
USPC .......................................................... 460/62
See application file for complete search history.

(56) References Cited

U.S. PATENT DOCUMENTS

| 4,244,380 | A | * | 1/1981 | DePauw et al. | 460/108 |
| 4,258,726 | A | * | 3/1981 | Glaser et al. | 460/109 |
| RE31,257 | E | * | 5/1983 | Glaser et al. | 460/80 |
| 4,541,441 | A | * | 9/1985 | Ichikawa et al. | 460/66 |
| 4,957,467 | A | * | 9/1990 | Zachary | 460/69 |
| 7,473,170 | B2 | * | 1/2009 | McKee et al. | 460/109 |
| 7,682,236 | B2 | * | 3/2010 | Buermann et al. | 460/109 |
| 8,231,446 | B2 | * | 7/2012 | Pope et al. | 460/62 |
| 8,540,559 | B1 | * | 9/2013 | Flickinger et al. | 460/69 |
| 2011/0320087 | A1 | * | 12/2011 | Farley et al. | 701/29 |

FOREIGN PATENT DOCUMENTS

| EP | 2614702 A1 * | 7/2013 |
| GB | 2024593 B * | 7/1982 |

* cited by examiner

*Primary Examiner* — Thomas B Will
*Assistant Examiner* — Joan D Misa

(57) ABSTRACT

A processing system for a combine harvester having a rotor housing that receives a rotor. A cover directs crop material through the rotor housing. At least one adjustable vane guides the crop material. The vane has a cover-facing proximal edge adjacent the cover and an edge projecting toward the rotor. A leading end of the vane is connected with a first pivot connection and the vane is connected to the cover along its inner edge with a second pivot connection. A line drawn through the pivot connections intersects a plane perpendicular to an axis of the cover and forms an angle with the plane of between 5 and 15 degrees. The vane pivots with respect to the cover about an axis along the line to adjust a tilt angle of the vane. Also, tilting the vane adjusts an angle of the distal edge of the vane relative the plane.

15 Claims, 7 Drawing Sheets

ADJUSTABLE VANE IN COMBINE HARVESTER

CROSS REFERENCE TO RELATED APPLICATION

This application claims the benefit of U.S. Provisional Application No. 61/716,328, entitled ADJUSTABLE VANE IN COMBINE HARVESTER filed Nov. 19, 2012, which is hereby incorporated by reference in its entirety.

BACKGROUND OF THE INVENTION

1. Field of Invention

This invention relates to crop harvesting machines of the type that use rotary processing devices, and more particularly to an adjustable vane in the rotary housing of the processing system.

2. Description of Related Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger. In one type of processing system the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the device.

It is well known to provide a housing for receiving a threshing and separating rotor with, secured to the inside of the housing, numerous guide vanes or bars which are arranged in a helical configuration. Conventionally, the guide vanes are fixed so that the rate of throughput of crop material can be varied only by changing the speed of rotation of the rotor.

Because processing systems are utilized to harvest a wide variety of different crops, it would be desirable to provide an adjustable vane system for the housing that could be easily and effectively adjusted and would not adversely affect the operating characteristics of the combine.

OVERVIEW OF THE INVENTION

In one embodiment, the invention is directed to a processing system for a combine harvester having a rotor housing that concentrically receives a rotor used for threshing and separating grain in crop materials. The processing system has a plurality of concave and/or separator grate assemblies arranged side-by-side axially along the processing system. The rotor housing has a cover to direct flow of crop material through the rotor housing around the rotor. The cover has at least one adjustable vane configured to guide crop material through the rotor housing extending from an inner surface of the cover. The vane has a curved shape such that a cover-facing proximal edge of the vane is in close proximity to the cover and an exposed distal edge projects away from the cover toward the rotor. A leading end of the vane is connected to the cover with a first pivot connection and the vane is connected to the cover along its inner edge with a second pivot connection. The first pivot connection is positioned closer to a front end of the cover than the second pivot connection such a line drawn through the first and second pivot connections intersects a plane perpendicular to an axis of the cover. The line forms an angle with the plane of between about 5 and 15 degrees. The vane pivots with respect to the cover about an axis along the line defined by the first and second pivot connections to adjust a tilt angle of the vane and wherein tilting the vane adjusts the angle of the distal edge of the vane relative the plane perpendicular to the cover axis.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
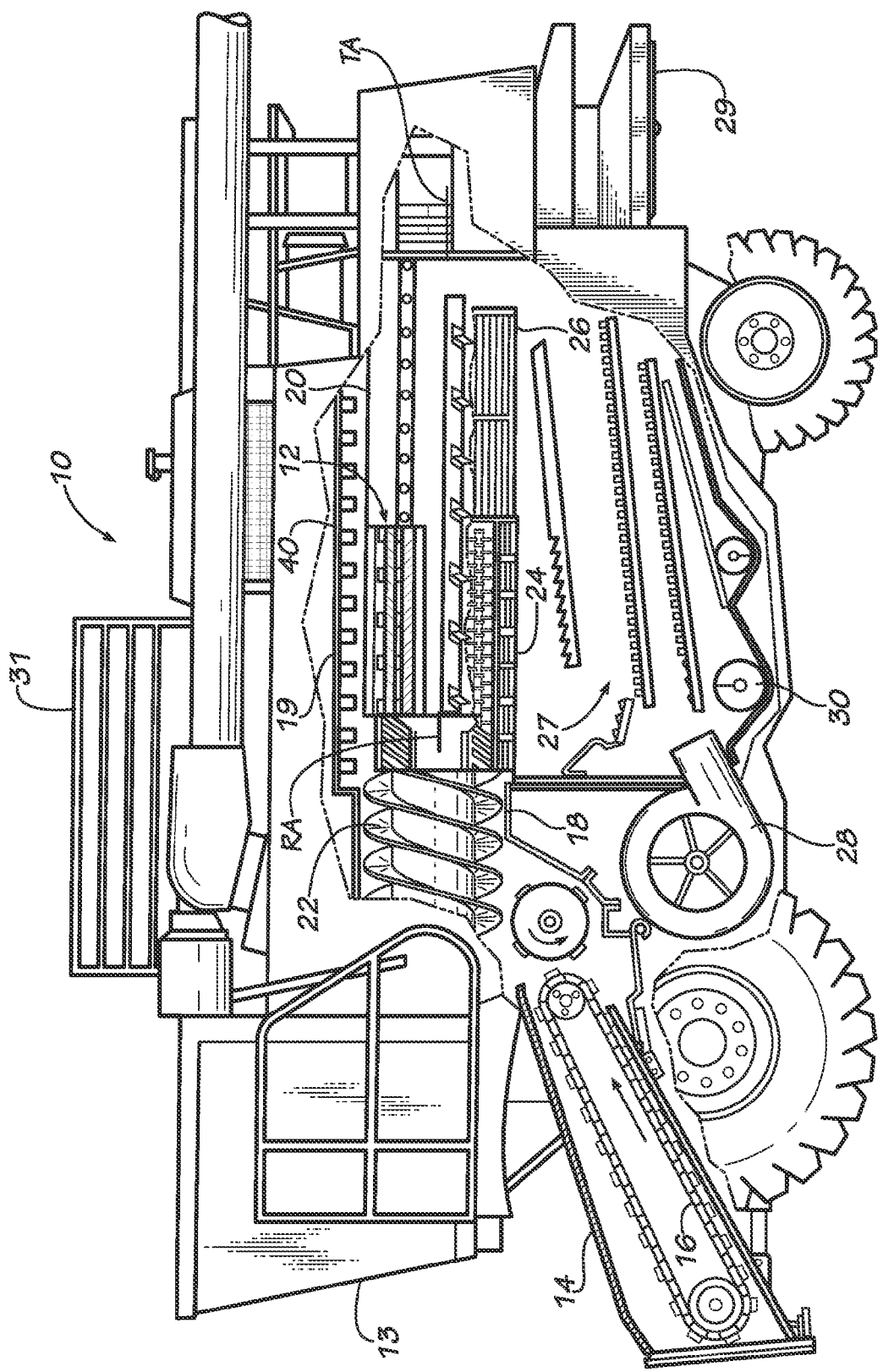
FIG. 1 is a schematic side elevational view of a combine harvester having a processing system utilizing axial flow and incorporating the principles of the present invention, portions of the harvester being broken away to reveal internal details of construction.

The exemplary combine harvester 10 selected for illustration in FIG. 1 has a single axial flow processing system 12 that extends generally parallel with the path of travel of the machine. However, as will be seen, the principles of the present invention are not limited to axial flow harvesters having only a single such processing system. For the sake of simplicity in explaining the principles of the present invention, this specification will proceed utilizing a single axial flow processing system as the primary example. Operation of the combine harvester 10 is controlled from operator's cab 13.

As well understood by those skilled in the art, in the illustrated embodiment combine harvester 10 includes a harvesting header (not shown) at the front of the machine that delivers collected crop materials to the front end of a feeder house 14. Such materials are moved rearwardly within feeder house 14 by a conveyer 16 until reaching the processing system 12.

In the illustrated embodiment, the crop processing system 12 has a rotor housing 19 and a rotor 20 located inside the housing 19. The front part of the rotor 20 and the rotor housing 19 define the infeed section of the crop processing system 12. Longitudinally downstream from the infeed section are a threshing section and a separating section. As is common in the industry, the rotor 20 comprises a cylindrical drum to which crop processing elements are affixed and a forwardly extending infeed auger 22 on the front end thereof. The auger 22 and rotor 20 advance the materials axially through the processing system 12 for threshing and separating. The rotor 20 is axially arranged in the combine harvester 10 and defines a central rotor axis RA. The rotor axis RA is a straight line passing through the infeed, threshing and separating portions the rotor 20.

Generally speaking, the crop materials entering processing system 12 move axially and helically therethrough during threshing and separating. During such travel, the crop materials are threshed and separated by the rotor 20 operating in cooperation with a foraminous separator comprising at least one threshing concave assembly 24 and separator grate assembly 26, with the grain and chaff escaping laterally through concave assemblies 24 and separator grate assemblies 26 into cleaning mechanism 27. Material other than grain (MOG) consisting of bulkier stalk and leaf material is retained by concave assemblies 24 and grate assemblies 26 and are impelled out the rear of processing system 12 and ultimately out of the rear 29 of the harvester 10. A blower 28 forms part of the cleaning mechanism 27 and provides a stream of air throughout the cleaning region below processing system 12 and directed out the rear of the harvester 10 so as to carry lighter chaff particles away from the grain as it migrates downwardly toward the bottom of the machine to a clean grain auger 30. Auger 30 delivers the clean grain to an elevator (not shown) that elevates the grain to a storage bin 31 on top of the machine, from which it is ultimately unloaded via an unloading spout.

The plurality of concave assemblies 24 and separator grate assemblies 26 are arranged side-by-side axially along the processing system 12 and with a top cover 40 form the tubular rotor housing 19 that concentrically receives rotor 20. The top cover 40 extends the full length of housing 19 and effectively closes off the top portion thereof from front to rear. The top cover 40 defines a threshing cover axis TA that is substantially parallel with the rotor axis RA. The concave assemblies 24 and separator grate assemblies 26 can be moved adjustably toward and away from rotor 20 to adjust the running clearance between the rotor 20 and concave and separator grate assemblies 24, 26 and to change the shape of the threshing and separating regions as is known in the art and need to be further discussed herein.

Figure 2:
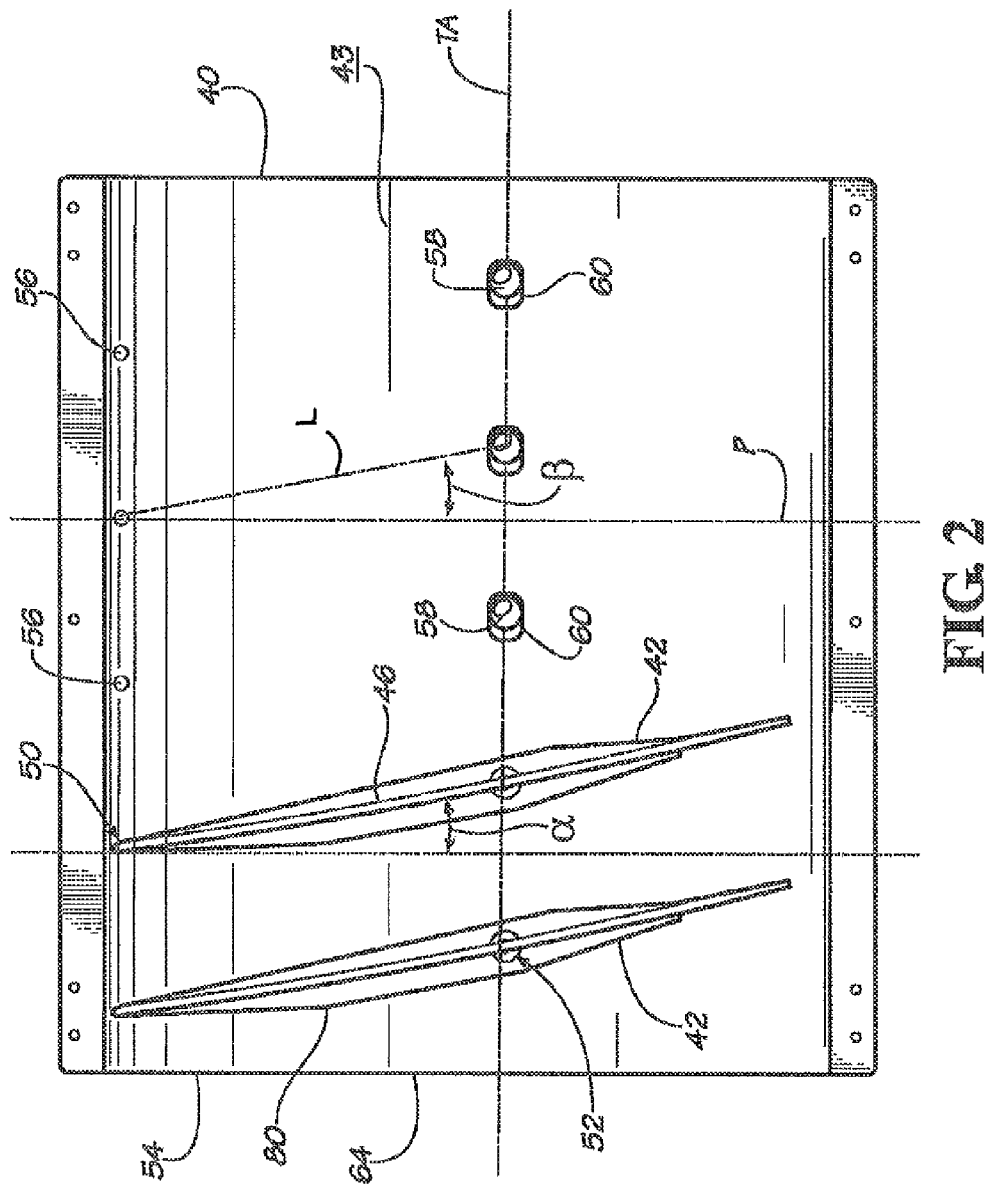
FIG. 2 is a bottom perspective view of a cover of the crop processing system shown in FIG. 1.
Figure 3:
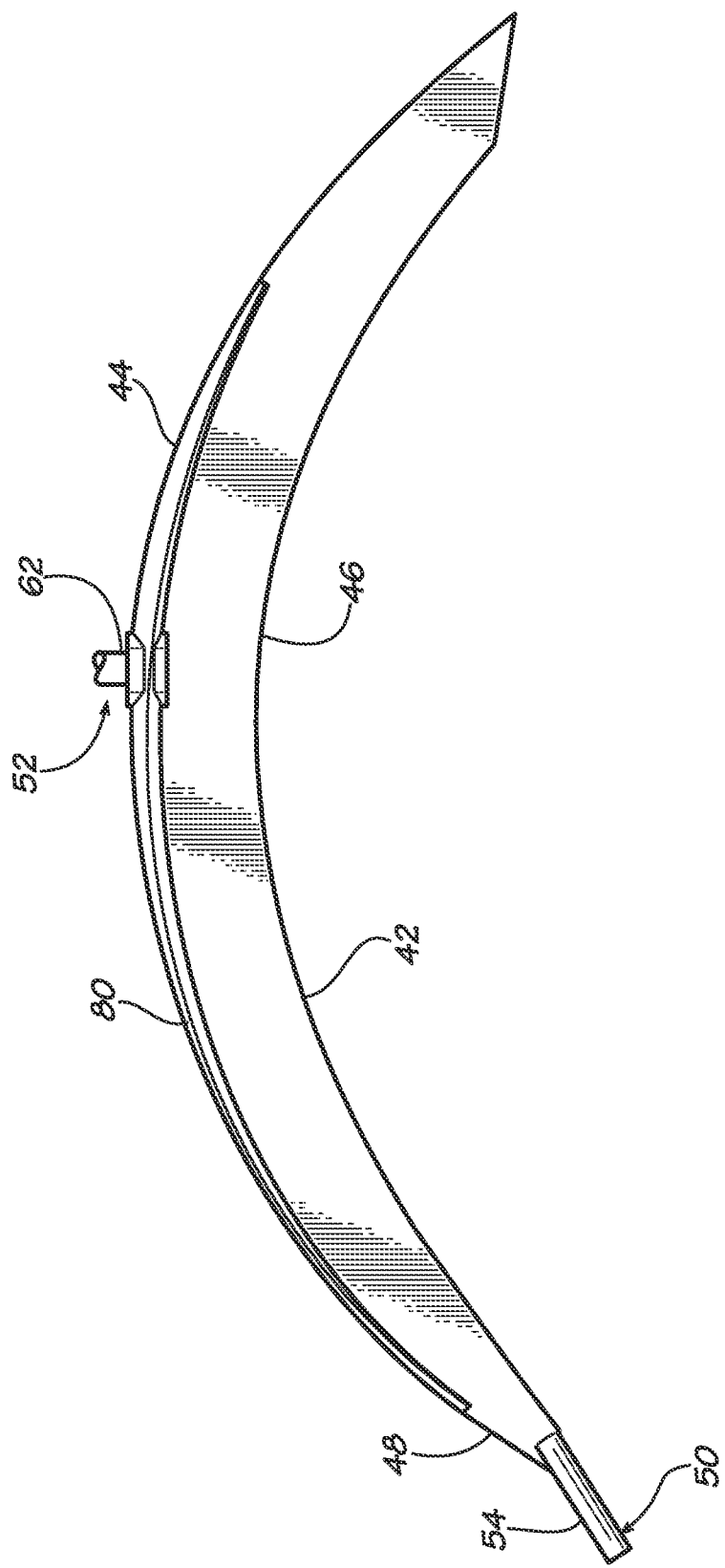
FIG. 3 is a side view of a movable vane mountable to the cover of the crop processing system of FIG. 2.

Turning now to FIG. 2, the cover 40 has a plurality of vanes 42 that guide the MOG through the rotor housing 19 projecting from an inner surface 43 of the cover 40. Desirably, the vanes 42 project from the cover 40 such that the vanes 42 extend over an upper portion of the tubular rotor housing 19. Desirably, the vanes 42 extend between about 90 degrees to about 160 degrees of the tubular rotor housing 19. Turning also now to FIG. 3, each vane 42 has a curved shape such that a cover-facing proximal edge 44 of the vane 42 adjacent the cover 40 is in close proximity to and generally matches the curvature of the inner surface 43 of the cover 40. An exposed distal edge 46 of the vane projects away from the cover 40 toward the rotor 20.

According to the invention, at least some of the vanes 42 are pivotably adjustable with respect to the cover 40. In the illustrated embodiment, a leading end 48 of the vane 42 is connected to the cover 40 by means of a first pivot connection 50. The vane 42 is also connected to the cover 40 along its inner proximal edge 44 at a point at or near the middle of the vane 42 with a second pivot connection 52. In the illustrated embodiment, the first pivot connection 50 is formed by a cylindrical end 54 on the vane 42 that is inserted into a circular opening 56 in the cover 40. The cylindrical end 54 is rotatable in the circular opening 56. However, one skilled in the art will understand that other pivotable connections may be used for the first pivot connection 50 using sound engineering judgment. In the illustrated embodiment, the second pivot connection 52 is formed by a ball and socket type connection. A pivotable ball 58 is received in a socket 60 of the cover 40. The ball 58 is connected to the vane 42 such as with a pin connector 62 so that movement of the ball 58 is translated into movement of the vane 42. However, one skilled in the art will understand that other pivotable connections may be used for the second pivot connection 52 using sound engineering judgment.

As best seen in the portion of FIG. 2 that has the vanes 42 removed for clarity, the first pivot connection 50 for each movable vane 42 is positioned closer to the front 64 of the cover 40 that its respective second pivot connection 52 such that a line L drawn through the first and second pivot connections 50, 52 intersects a plane P perpendicular to the threshing cover axis TA. Desirably, the line L forms an angle β with the plane P of between about 5 and 15 degrees. In the illustrated embodiment, the line L forms and angle β of 10 degrees with the plane P.

Figure 4:
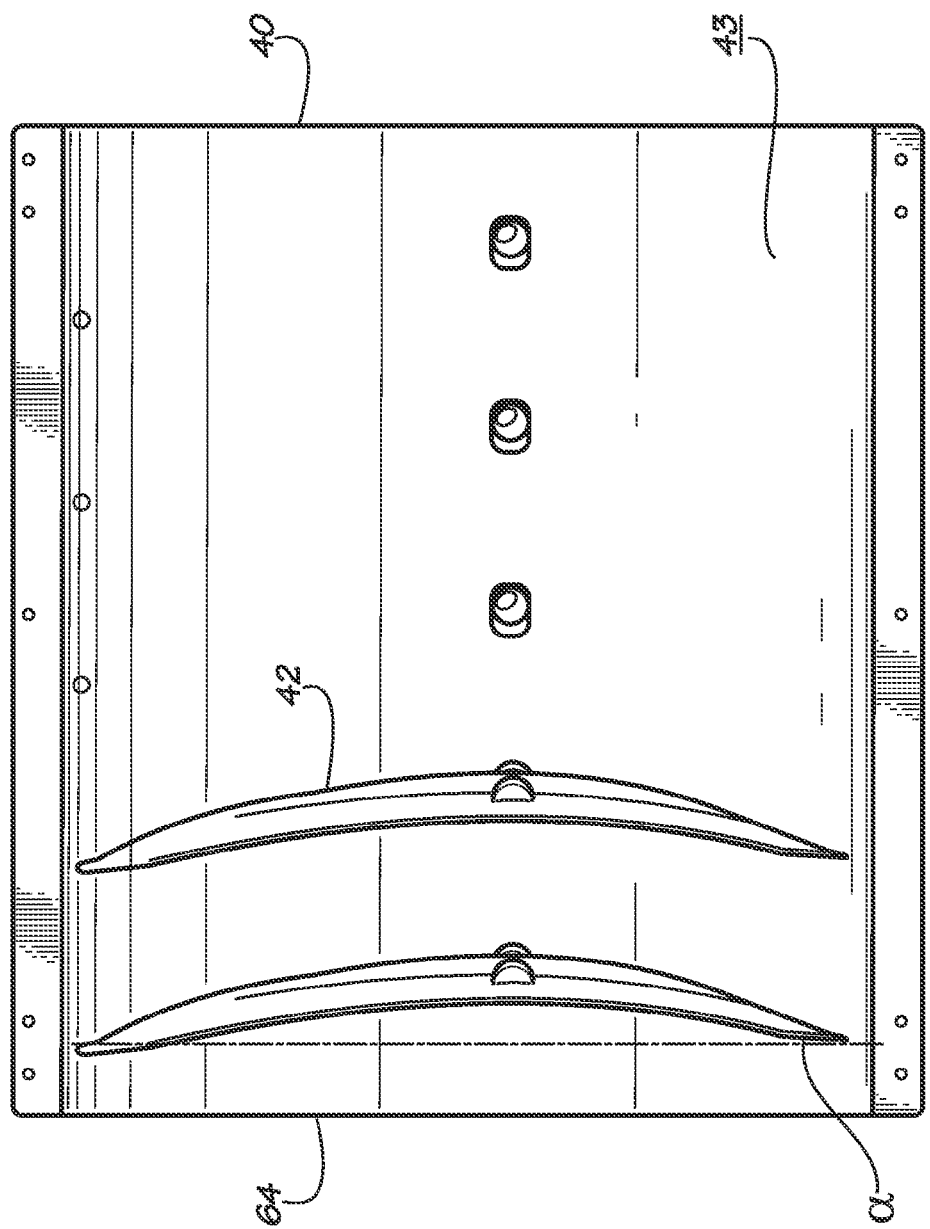
FIG. 4 is another bottom perspective view of the cover shown in FIG. 2.
Figure 5:
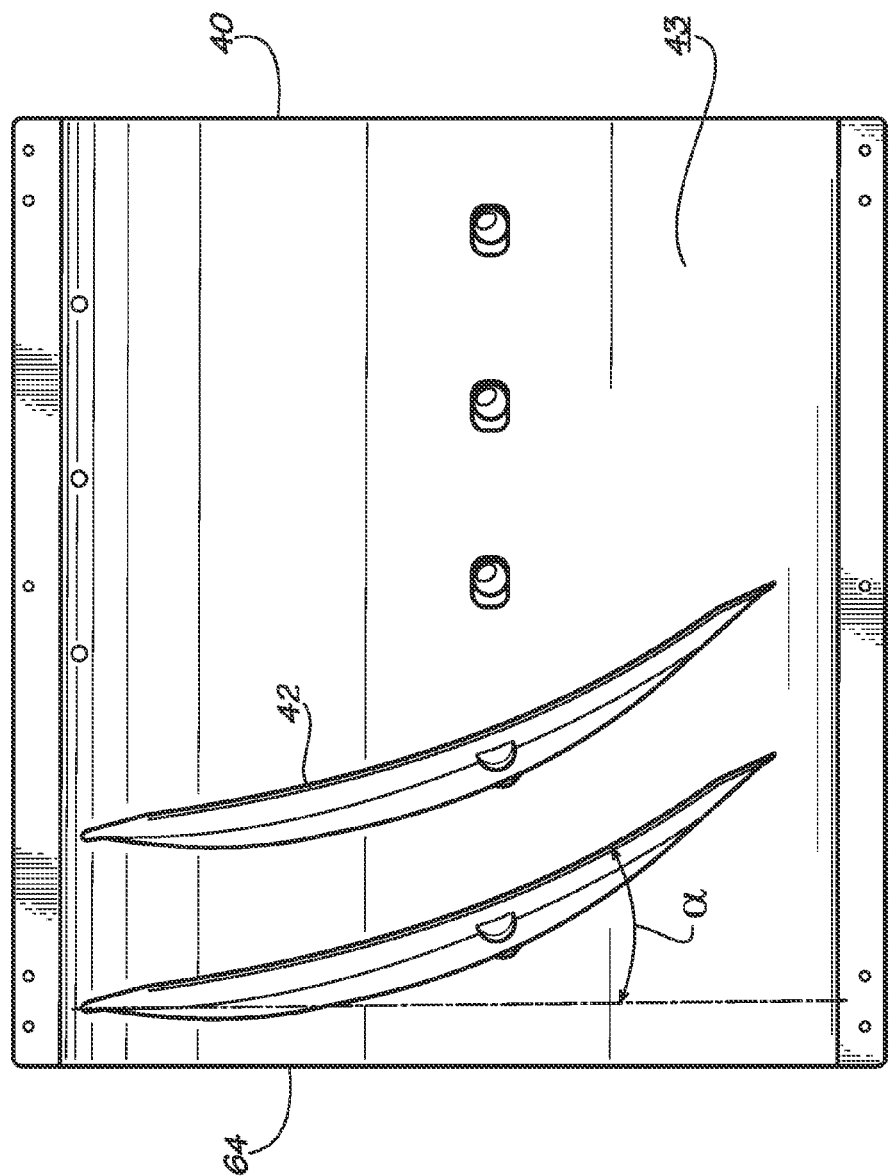
FIG. 5 is a further bottom perspective view of the cover shown in FIG. 2.

As illustrated in FIGS. 4 and 5, each adjustable vane 42 pivots with respect to the cover 40 about an axis along line L defined by the first and second pivot connections 50, 52 to adjust an inclination or tilt angle of the vane 42. In the position illustrated in FIG. 2, each vane 42 is adjusted such that the vane 42 extends substantially perpendicular from the inner surface 43 of the cover 40. In FIG. 4, each vane 42 is pivoted such that the vane 42 is tilted toward the front 64 of the cover 40. In FIG. 5, the vane 42 is shown pivoted in the opposite direction such that the vane 42 tilts away from the front 64 of the cover 40. As can be seen in FIGS. 2, 4 and 5, tilting the vane 42 also adjusts the position of the distal edge 46 of the vane 42 relative the plane P perpendicular to the threshing cover axis TA. In FIG. 2, the distal edge 46 of the vane 42 forms an angle α with plane P that is substantially the same as the angle β of line L. With the vane 42 tilted toward the front of the cover 40 as shown in FIG. 4, the distal edge 46 forms an angle α that is smaller than the angle when the vane 42 is not tilted as shown in FIG. 2. In the position illustrated in FIG. 4, the angle α formed by the distal edge 46 is about 0 degrees. With the vane 42 tilted away from the front 64 of the cover 40 as shown in FIG. 5, the distal edge 46 forms an angle α that is larger than the angle when the vane 42 is not tilted as shown in FIG. 2. In the position illustrated in FIG. 5, the angle α formed by the distal edge is about 20 degrees. Thus, the tilt angle of the vanes 42 is adjustable so as to adjust the angle α formed by the distal edges 46 of the vanes 42, thereby changing the amount of time the MOG spends in the threshing and separating regions inside the rotor housing 19. Desirably, the distal edge 46 of the vane 42 is substantially straight, but one skilled in the art will understand that there may be some curvature along the length of the vane 42 without departing from the scope of the invention. In such cases, the angle α formed by the distal edge 46 may be measured by drawing a line from a point on the leading end 48 of the vane 42 to a point at the opposite end of the vane.

Figure 6:
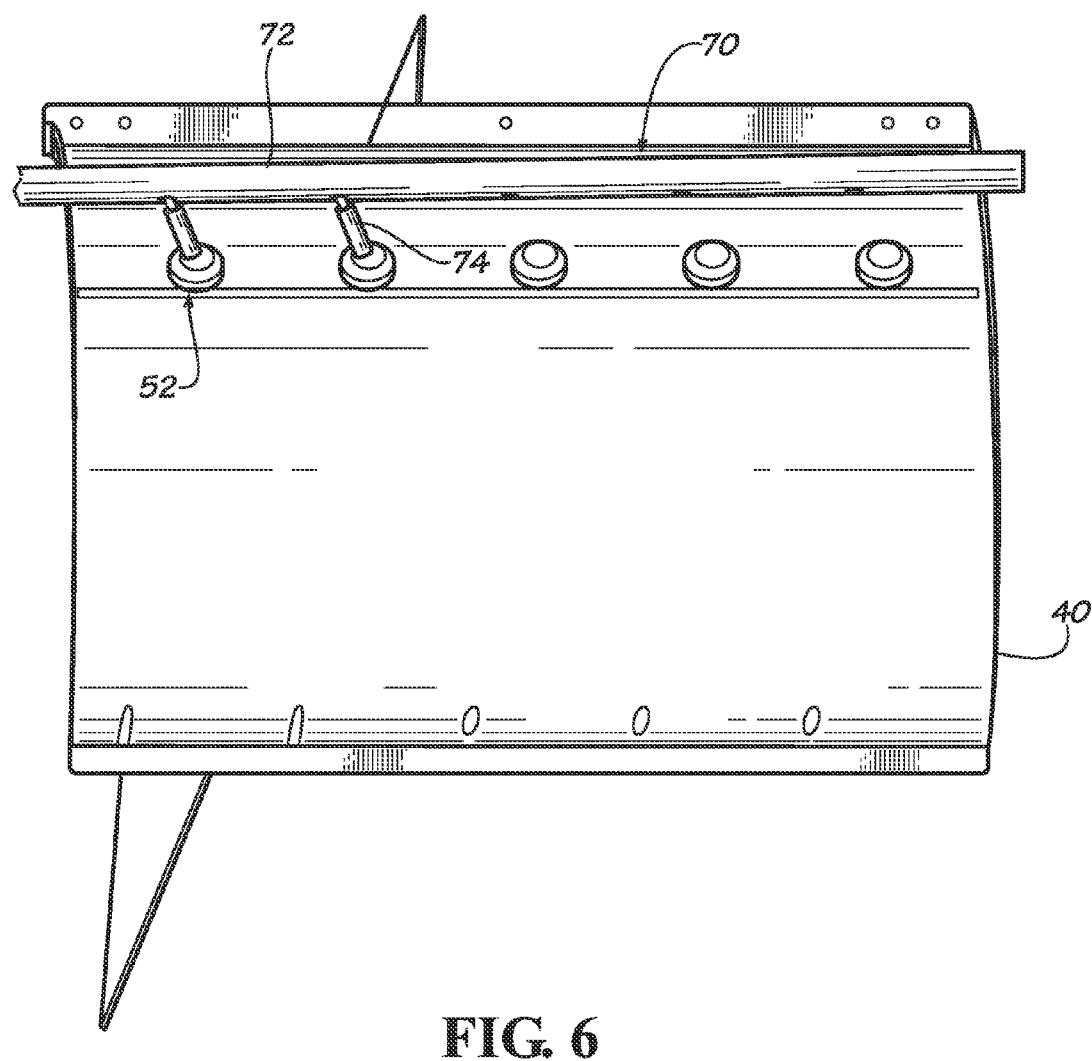
FIG. 6 is a top perspective view of the cover shown in FIG. 2.

As best seen in FIG. 6, the adjustable vanes 42 are connected to an actuation mechanism 70 at the second connection point 52 on the adjustable vane 42. In one embodiment, the actuation mechanism 70 comprises a bar 72 located outside the cover 40 and connected to one, more than one, or preferably all of the vanes 42 with suitable arm linkages 74. The arm linkage is connected to the ball 58 of the second connection point 52. The actuation mechanism 70 causes swinging motion of the adjustable vanes 42 about their pivot axis along line L. A force directed substantially along the longitudinal direction on the bar 72 causes a shifting of one, more than one, or preferably all of the adjustable vanes 42 about their respective pivot axes. One skilled in the art will understand that other means for providing actuation mechanism 70 may be used using sound engineering judgment. The vanes 42 can be shifted from a position corresponding to the helical path (FIG. 5) to a position wherein the adjustable vanes 42 are forwardly shifted (FIG. 4) wherein some of the helical crop flow between the rotor 20 and housing 19 will take a longer route through the annular passage between the rotor 20 and the housing 19, i.e., the crop material will make more helical rotations within the separating section of the rotor housing 19 between the separating section inlet and outlet. A motion actuator (not shown) controls longitudinal movement of the actuation mechanism 70. One skilled in the art will understand that the motion actuator can be a manual actuator, a pneumatic cylinder, a hydraulic cylinder, an electric linear actuator or any other known motion actuator. Desirably, the motion actuator can be controlled from the operator cabin 13.

Figure 7:
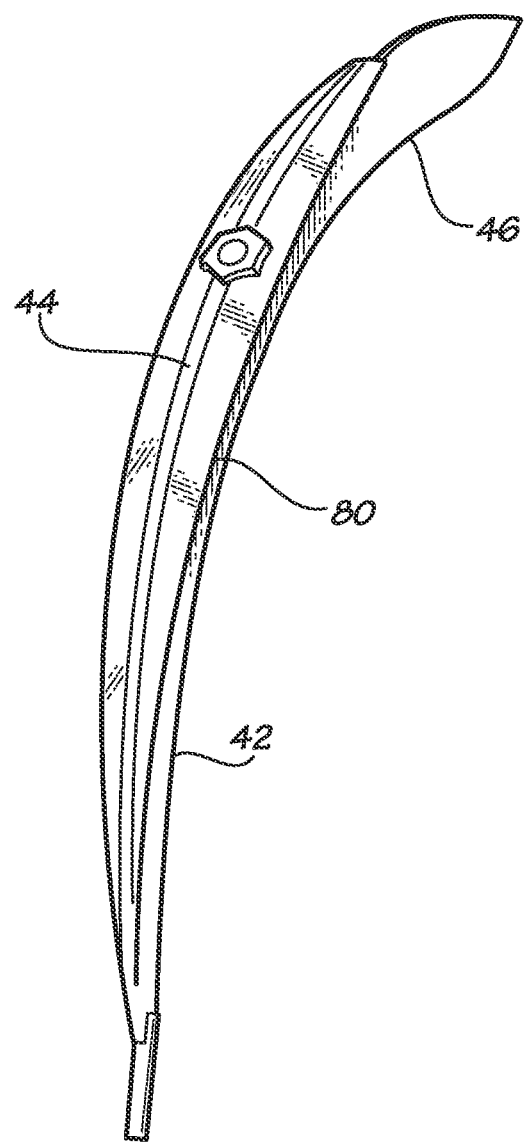
FIG. 7 is a top perspective view of the movable vane of FIG. 3.

Turning now to FIG. 7, pivoting of the adjustable vanes 42 may cause the formation of a gap between the inner surface 43 of the cover and the cover-facing proximal edge 44 of the vane 42. In one embodiment, a shingle 80 is used to shield the junction of the proximal edge 44 and the inner surface 43 to discourage crop material from entering the gap and jamming the adjustable vane 42. In one embodiment, the shingle 80 is formed as part of the vane 42 and extends from the vane in a direction generally parallel to the inner surface 43 of the cover 40. Desirably, the shingle 80 extends a distance sufficient to shield the junction between the inner surface 43 and the proximal edge 44, but does not interfere with the desired tilting of the vane 42 with respect to the cover 40 as shown in FIGS. 4 and 5. Alternately, shingle 80 may be attached to the inner surface 43 of the cover 42, without departing from the scope of the invention.

Changing the angle of the vanes 42 may be used to vary the rate of axial progression of crop material through the rotor housing 19 so as to control the efficiency of threshing and separating. If, for example, excessive losses of grain in discharged straw occur, the crop material flow rate can be reduced by adjustment of the vanes 42 such as, for example, varying the angle of inclination or the pitch of the vanes 42.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. An improved processing system for a combine harvester having a rotor housing that concentrically receives a rotor used for threshing and separating grain in crop materials, the processing system comprising a plurality of concave and/or separator grate assemblies arranged side-by-side axially along the processing system, the rotor housing comprising a cover to direct flow of crop material through the rotor housing around the rotor, the improvement comprising at least one adjustable vane configured to guide crop material through the rotor housing extending from an inner surface of the cover, said vane having a curved shape such that a cover-facing proximal edge of the vane is in close proximity to the cover and an exposed distal edge projects away from the cover toward the rotor, wherein a leading end of the vane is connected to the cover by means of a first pivot connection and said vane is connected to the cover along said proximal edge with a second pivot connection, wherein the first pivot connection is positioned closer to a front end of the cover than the second pivot connection such that a line drawn through the first and second pivot connections intersects a plane perpendicular to an axis of the cover, said line forming an angle with the plane of between about 5 and 15 degrees, wherein said vane pivots with respect to the cover about a pivot axis along said line defined by the first and second pivot connections to adjust a tilt angle of the vane and wherein tilting the vane adjusts an angle of the distal edge of the vane relative the plane perpendicular to the cover axis.

2. The processing system of claim 1 wherein when the vane is adjusted such that the vane extends substantially perpendicular from the inner surface of the cover, the distal edge of the vane forms an angle with said plane that is substantially the same as the angle of said line.

3. The processing system of claim 2 wherein when the vane is pivoted such that the vane is tilted toward the front of the cover, the distal edge forms an angle with said plane that is smaller than an angle formed with said plane when the vane is not tilted.

4. The processing system of claim 3 wherein the angle formed by the distal edge when the vane is pivoted such that the vane is tilted toward the front of the cover is about 0 degrees.

5. The processing system of claim 2 wherein when the vane is pivoted such that the vane is tilted away from the front of the cover, the distal edge forms an angle with said plane that is larger than an angle formed with said plane when the vane is not tilted.

6. The processing system of claim 5 wherein the angle formed by the distal edge when the vane is pivoted such that the vane is tilted away from the front of the cover is about 20 degrees.

7. The processing system of claim 1 wherein the vane is connected to an actuation mechanism at the second connection point, said actuation mechanism causing swinging motion of the adjustable vane about said pivot axis along said line.

8. The processing system of claim 7 wherein the actuation mechanism comprises a bar located outside the cover with an arm linkage connected to the second connection point.

9. The processing system of claim 1 further comprising a shingle configured to shield a junction of the proximal edge of the vane and the inner surface to discourage crop material from entering any gap at said junction.

10. The processing system of claim 9 wherein the shingle is formed as part of the vane and extends from the vane in a direction generally parallel to the inner surface of the cover.

11. The processing system of claim 9 wherein the shingle attached to the inner surface of the cover.

12. The processing system of claim 1 wherein said second pivot connection is located at the middle of the vane.

13. The processing system of claim 1 wherein the first pivot connection is formed by a cylindrical end on the vane that is inserted into a circular opening in the cover such that the cylindrical end is rotatable in the circular opening.

14. The processing system of claim 1 wherein the second pivot connection is formed by a ball and socket connection.

15. The processing system of claim 1 wherein the line forms an angle of 10 degrees with the plane.

* * * * *